US008124297B2

United States Patent
Kurungot et al.

(10) Patent No.: US 8,124,297 B2
(45) Date of Patent: Feb. 28, 2012

(54) SOLID POLYMER FUEL CELL AND METHOD FOR PRODUCING MEA USED FOR SOLID POLYMER FUEL CELL

(75) Inventors: Sreekumar Kurungot, Toyota (JP); Hirokazu Ishimaru, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 781 days.

(21) Appl. No.: 12/281,816

(22) PCT Filed: Mar. 1, 2007

(86) PCT No.: PCT/JP2007/054493
§ 371 (c)(1),
(2), (4) Date: Sep. 5, 2008

(87) PCT Pub. No.: WO2007/102564
PCT Pub. Date: Sep. 13, 2007

(65) Prior Publication Data
US 2009/0068527 A1 Mar. 12, 2009

(30) Foreign Application Priority Data

Mar. 6, 2006 (JP) .................... 2006-059708
Dec. 26, 2006 (JP) .................... 2006-350255

(51) Int. Cl.
*H01M 4/96* (2006.01)
*H01M 8/10* (2006.01)
(52) U.S. Cl. ........ 429/521; 429/403; 429/405; 429/479; 429/483; 429/484; 429/487; 429/492; 429/532
(58) Field of Classification Search .......... 429/403, 429/405, 479, 483, 484, 487, 492, 532, 521
See application file for complete search history.

(56) References Cited

U.S. PATENT DOCUMENTS

2002/0192535 A1* 12/2002 Fukuda et al. ................ 429/42
2007/0027029 A1 2/2007 Kasuya et al.

FOREIGN PATENT DOCUMENTS

| EP | 1 383 186 A1 * | 1/2004 |
|---|---|---|
| JP | 2002-373662 | 12/2002 |
| JP | 2004-152489 | 5/2004 |
| WO | WO 02/075831 A1 | 9/2002 |
| WO | WO 2004/030128 A1 | 4/2004 |
| WO | WO 2004/108275 A1 | 12/2004 |

OTHER PUBLICATIONS

T. Yoshitake et al., "Preparation of Fine Platinum Catalyst Supported on Single-wall Carbon Nanohorns for Fuel Cell Application," Physica B, vol. 323, pp. 124-126 (2002).

* cited by examiner

*Primary Examiner* — Ling-Siu Choi
(74) *Attorney, Agent, or Firm* — Finnegan, Henderson, Farabow, Garrett & Dunner, LLP

(57) ABSTRACT

This invention intends to improve the catalyst efficiency by sufficiently providing a triple phase boundary where reaction gas, catalysts, and electrolytes meet in carbon nanohorns. With the utilization of the resulting MEA, the electrode reactions are allowed to effectively proceed, and the power generation efficiency of a fuel cell is improved to result in a solid polymer fuel cell with excellent properties. Such solid polymer fuel cell comprises electrodes having a catalyst layer comprising: a carrier comprising a carbon nanohorn aggregate; catalytic metals supported on the carrier comprising a carbon nanohorn aggregate; and polymer electrolytes coating the carrier comprising a carbon nanohorn aggregate, wherein the proportion of the polymer electrolyte to the carbon nanohorn aggregate is 0.32:1 to 0.70:1 by weight.

8 Claims, 16 Drawing Sheets

SOLID POLYMER FUEL CELL AND METHOD FOR PRODUCING MEA USED FOR SOLID POLYMER FUEL CELL

TECHNICAL FIELD

The present invention relates to a solid polymer fuel cell and a method for producing MEA used for the solid polymer fuel cell.

BACKGROUND ART

A size and weight of a solid polymer fuel cell that has a polymer electrolytic membrane can be easily reduced. Accordingly, practical applicability thereof as a power source for a mobile vehicle such as an electric vehicle or a small-size cogeneration system has been awaited.

The electrode reaction in the anode catalyst layer and in the cathode catalyst layer of a solid polymer fuel cell progresses at a triple phase boundary where reaction gases, catalysts, and fluorine-containing ion exchange resins (i.e., electrolytes) meet (hereafter referred to as a "reaction site"). Accordingly, a catalyst, such as a metal-supporting carbon catalyst that supports catalytic metals such as platinum on carbon black carriers with large specific surface areas and that is coated with a fluorine-containing ion exchange resin, which is the same with or different from the polymer electrolytic membrane, have been heretofore used as a constituent material for a catalyst layer of a solid polymer fuel cell.

Thus, proton and electron generation that takes place in the anode is carried out in the presence of the triple phase of catalysts, carbon particles, and electrolytes. Specifically, hydrogen gas is reduced in the presence of electrolytes that protons conduct, carbon particles that electrons conduct, and catalysts. Accordingly, the power generation efficiency increases as the amount of catalysts supported on carbon particles increases. The same applies to the cathode. Since catalysts used for fuel cells are noble metals such as platinum, the increased amount of catalysts supported on carbon particles disadvantageously increases the cost for producing fuel cells.

According to conventional methods for producing catalyst layers, an ink comprising an electrolyte such as Nafion® and catalyst powders of platinum, carbon, or the like dispersed in a solvent is casted and dried. Since catalyst powders are of several nms to several tens of nms, catalyst powders penetrate deep into the carbon carrier pores. In contrast, molecules of an electrolytic polymer are large and aggregated, and thus, an electrolytic polymer is deduced to be incapable of penetrating nano-sized pores and to merely cover the catalyst surface. Thus, platinum in the pores is not in full contact with the electrolytic polymer and it cannot be effectively utilized, which disadvantageously deteriorates catalyst performance.

JP Patent Publication (kokai) No. 2002-373662 A discloses a method for producing electrodes of a fuel cell wherein an electrode paste comprising catalyst-supporting particles comprising catalyst particles supported on the surfaces in combination with an ion-conducting polymer is treated with a solution comprising catalytic metal ions to subject the catalytic metal ions to ionic conversion into an ion-conducting polymer and then to reduce catalytic metal ions, for the purpose of improving power generation efficiency without increasing the amount of catalysts supported on carbon particles.

WO 2002/075831 discloses a solid polymer electrolyte-catalyst composite electrode which is composed of carbon particles supporting a solid polymer electrolyte and a catalytic material. The solid polymer fuel cell electrode contains carbon particles which are monolayer carbon nanohorn aggregates in which monolayer carbon nanohorns made up of monolayer carbon nanotubes of a unique structure having a conical shape at one end are aggregated into balls and a solid polymer fuel cell using the electrode, for the purpose of improving the efficiency of catalyst utilization for catalytic electrodes for a fuel cell.

WO 2002/075831 contains statements such that "carbon nanohorn . . . . When the aggregates are used as the carbon substances to constitute the solid polymer electrolyte-catalyst combined electrode, there may be provided secondary aggregates obtained by aggregating a plurality of the aggregates. Pores each having a size of several nms to tens nms exist between the secondary aggregates. Therefore, the combined electrode will have a porous structure. The pores effectively contribute to the channel of the reaction gas such as oxygen and hydrogen. When the secondary aggregates are formed, the catalytic material can be carried to inside the secondary aggregates, and the solid polymer electrode can penetrate into the secondary aggregates, thereby providing excellent catalytic efficiency." This document also contains statements such that "at least a part of the carbon molecule aggregates or the carbon nano-horn aggregates 10 has an incomplete part. The term "incomplete part" herein means a broken structural part. For example, a carbon-carbon bond in a six-member ring is partly cut, or a carbon atom therein is lost, which constitutes the carbon molecule or the carbon nano-horn 5. A vacancy or a bond with other kind of a molecule may be formed. The above-mentioned incomplete part may be large and expanded to such an extent that it is referred to as a hole in the carbon six-member ring. Each of them herein refers the "pore". The pore may have, but not especially limited thereto, a diameter of about 0.3 to 5 nm, although the pore diameter is not particularly limited."

Also, JP Patent Publication (kokai) No. 2004-152489 A discloses an invention wherein a carbon nanohorn aggregate is used as a carbon material for use in a catalyst layer of a catalyst supporting carbon particle, a solution of a metallic salt, and the carbon nanohorn aggregate are mixed, a reducing agent is added and mixed with agitation, a catalytic metal is supported on the surface of the carbon nanohorn aggregate, and a reducing-treatment is performed at a low temperature to regulate a particle diameter of the catalyst metal, for the purpose of improving the efficiency of catalyst utilization for catalytic electrodes for a fuel cell.

DISCLOSURE OF THE INVENTION

Even if the treatment as disclosed in JP Patent Publication (kokai) No. 2002-373662 A was carried out, improvement in power generation efficiency was limited. This is because catalyst supporting carbon has nano-sized pores into which a polymer electrolyte, i.e., a polymer aggregate, cannot penetrate, and platinum catalysts or the like adsorbed to the deep parts of such pores cannot serve as the triple phase boundary, i.e., the reaction site. Thus, the fact that an electrolytic polymer could not penetrate into carbon pores was the issue of concern.

The method of WO 2002/075831 involves the use of a carbon nanohorn aggregate as a carbon carrier. However, there are sharp gaps between carbon nanohorns of the carbon nanohorn aggregate. If platinum catalysts or the like are adsorbed to the deep parts thereof, a polymer electrolyte as a polymer aggregate cannot penetrate into the aggregate. Thus, the formation of the triple phase boundary (the reaction site) was not satisfactory and improvement in power generation efficiency was insufficient. The term "pores each having a size of about several nms to tens nms" used in WO 2002/075831 refers to gaps of the secondary aggregate of the carbon nanohorn aggregate. Also, the term "pore . . . a diameter of about 0.3 to 5 nm" used therein refers to a disturbance of a 6-member ring structure of a carbon atom that constitutes a carbon nanohorn. These terms do not specifically describe how pores contribute to the formation of the triple phase boundary (the reaction site).

According to the method of JP Patent Publication (kokai) No. 2004-152489 A, the particle diameters of catalytic metals supported on the carbon nanohorn aggregate surface are regulated and the average particle diameter of catalytic metals is set to be 5 nm or smaller. This document also states that "the average particle diameter of catalytic substances is 5 nm or smaller, and the average particle diameter of 2 nm or smaller is more preferable. This can further reduce the specific surface areas of catalytic substances. Accordingly, the catalyst efficiency when used for a fuel cell can be enhanced and the fuel cell output can further be improved. Although the lower limit of the particle diameter is not particularly limited, the diameter can be 0.1 nm or larger, and preferably 0.5 nm or larger, for example. Thus, electrodes having good catalyst efficiency can be obtained with good production stability." Accordingly, a smaller average particle diameter of catalytic substances is considered more preferable. It is also described that "in order to improve the fuel cell performance, it is necessary to enhance the catalyst activity of catalytic electrodes by increasing the surface areas of catalytic substances. To this end, it is necessary to reduce the particle diameters of catalyst particles and to uniformly disperse the particles." In the examples of this document, platinum particles with the average particle diameter of 1 nm to 2 nm are actually used.

The studies conducted by the present inventors demonstrated that use of platinum particles with the average particle diameter of not greater than 1 nm to 2 nm results in insufficient formation of the triple phase boundary (the reaction site) and insufficient improvement in power generation efficiency due to the adsorption of platinum catalysts or the like to deep parts of sharp gaps between carbon nanohorns of the carbon nanohorn aggregate, which disables a polymer electrolyte as a polymer aggregate to penetrate, as with the case of WO 2002/075831.

Thus, the inventions according to the above-cited documents were intended to promote the formation of the triple phase boundary (the reaction site), although such promotion was insufficient and improvement in power generation efficiency was also insufficient.

The present invention has been made in view of the above drawbacks of conventional techniques. An object of the present invention is to improve the catalyst efficiency by sufficiently providing a triple phase boundary where reaction gas, catalysts, and electrolytes meet in a catalyst layer of MEA for a fuel cell comprising carbon nanohorn carriers. The present invention is intended to effectively proceed the electrode reactions and to improve the power generation efficiency of a fuel cell. Further, the present invention is intended to provide electrodes having excellent properties and a solid polymer fuel cell comprising the same and capable of providing high cell output.

The present inventors focused on the amount of the polymer electrolyte to the carbon nanohorn aggregate of an electrode catalyst for a fuel cell and discovered that mixing thereof at a given quantitative ratio can result in satisfactory formation of a triple phase boundary where reaction gas, catalysts, and electrolytes meet and that the catalyst efficiency can be thereby improved. This has led to the completion of the present invention.

Specifically, the first aspect of the present invention provides a solid polymer fuel cell comprising electrodes having a catalyst layer comprising: a carrier comprising a carbon nanohorn aggregate; catalytic metals supported on the carrier comprising a carbon nanohorn aggregate; and polymer electrolytes coating the carrier comprising a carbon nanohorn aggregate, wherein the proportion of the polymer electrolyte to the carbon nanohorn aggregate is 0.32:1 to 0.70:1 by weight.

In the solid polymer fuel cell of the present invention, the catalyst layer preferably has micropores with pore diameters of 0.005 μm to 0.1 μm disposed among the polymer electrolytes.

By adjusting the proportion of the polymer electrolyte to the carbon nanohorn aggregate to 0.32:1 to 0.70:1 by weight, the catalyst layer of MEA for a solid polymer fuel cell can have micropores with pore diameters of 0.005 μm to 0.1 μm disposed among the polymer electrolytes. As a result, the catalyst layer can sufficiently provide a triple phase boundary where reaction gas, catalysts, and electrolytes meet, which can improve the catalyst efficiency. The power generation properties in the high current density area are particularly improved.

As carriers that support catalysts used for the solid polymer fuel cell of the present invention, a carbon nanohorn aggregate can be used alone or in combination with carbon black. In such a case, the proportion of the polymer electrolyte to the mixture of the carbon nanohorn aggregate and carbon black is 0.30:1 to 0.10:1 by weight, and the proportion of carbon black to the carbon nanohorn aggregate is preferably 10:90 to 90:10 by weight.

Use of the carbon nanohorn aggregate in combination with carbon black enables the catalyst layer to comprise micropores with pore diameters of 0.005 μm to 0.1 μm disposed among the polymer electrolytes. As a result, a triple phase boundary where reaction gas, catalysts, and electrolytes meet can be sufficiently provided in the catalyst layer. This can improve the catalyst efficiency. The power generation properties in the high current density area are particularly improved.

The second aspect of the present invention provides a method for producing MEA used for the above solid polymer fuel cell comprising the steps of: preparing a catalyst layer on a carrier comprising a carbon nanohorn aggregate using an electrode catalyst for a fuel cell prepared by allowing the carrier comprising carbon nanohorn aggregate to support catalytic metals and coating the carrier comprising carbon nanohorn aggregate with a polymer electrolyte and a catalyst ink comprising a solvent; and producing MEA via hot press, wherein the catalyst ink is prepared to comprise the catalytic metals in amounts that are 40% to 70% those of the carbon nanohorn aggregate by weight, the polymer electrolyte in amounts that are 0.32 to 0.70 those of the carbon nanohorn aggregate by weight, and the solvent in amounts that are 30 to 40 those of the polymer electrolyte by weight. When the amounts of catalytic metals, a carbon nanohorn aggregate, and a polymer electrolyte are within such ranges, the catalyst layer can have micropores with pore diameters of 0.005 μm to 0.1 μm disposed among the polymer electrolytes.

Preferably, the aforementioned catalyst ink involves a step of dispersing catalytic metal salts in a solvent, a step of adding carbon nanohorn aggregate, a step of reducing, filtering, and drying the mixture while heating it, and a step of coating the obtained catalytic metal supporting carbon nanohorn aggregate with polymer electrolyte.

The average particle diameter of the catalytic metals is preferably between 3.2 nm and 4.6 nm. Specifically, the average particle diameter of catalytic metals can be adjusted to 3.2 nm to 4.6 nm by regulating (1) the amount of catalytic metals supported on carbon nanohorn aggregates, (2) the reduction temperature, (3) the reduction time, and (4) combination of two or more of (1) to (3).

Specifically, it is preferable that (1) the proportion of the catalytic metals supported on carbon nanohorn aggregates be 45% to 70% by weight, (2) the reduction temperature be 130° C. to 180° C., and (3) the reduction time be between 8 hours and 16 hours.

In the present invention, carbon nanohorn aggregates are preferably pretreated with a hydrogen peroxide solution in order to promote the supporting of catalytic metals on carbon nanohorn aggregate carriers and the coating thereof with polymer electrolytes.

The carbon nanohorn aggregate is preferably pretreated with a hydrogen peroxide solution.

As described above, the solid polymer fuel cell of the present invention can comprise a carbon nanohorn aggregate alone or in combination with carbon black as a catalyst supporting carrier. In such a case, the proportion of the polymer electrolyte to the mixture of the carbon nanohorn aggregate and carbon black is 0.30:1 to 0.10:1 by weight, and the proportion of carbon black to the carbon nanohorn aggregate is preferably 10:90 to 90:10 by weight. Use of carbon nanohorn aggregates in combination with carbon black can further improve catalyst efficiency. The power generation properties in the high current density area are particularly improved.

Provision of MEA for a fuel cell with high catalyst efficiency and excellent power generation properties enables the construction of a solid polymer fuel cell exhibiting high cell output.

Effects of the Invention

In the present invention, the proportion of the polymer electrolytes to carbon nanohorn aggregates is regulated to 0.32:1 to 0.70:1 in the catalyst layer of the electrodes by weight. This enables the catalyst layer of MEA for a fuel cell to comprise micropores with pore diameters of 0.005 μm to 0.1 μm disposed among the polymer electrolytes. As a result, the fuel cell of the present invention can sufficiently provide a triple phase boundary in the catalyst layer, and a small amount of catalytic metals can be effectively used in the reaction. Thus, the efficiency of catalyst utilization is improved and the power generation efficiency is improved with the use of the same amount of materials. The power generation properties in the high current density region are particularly improved.

DESCRIPTION OF NUMERAL REFERENCES

1: Catalyst-supporting carriers (Pt/CNH)
2: Polymer electrolytes (Nafion)
3: Micropores Preferred Embodiments of the Invention Hereafter, the present invention is described with reference to schematic diagrams of electrode catalysts for fuel cells of the present invention and of a conventional technique.

Figure 1:
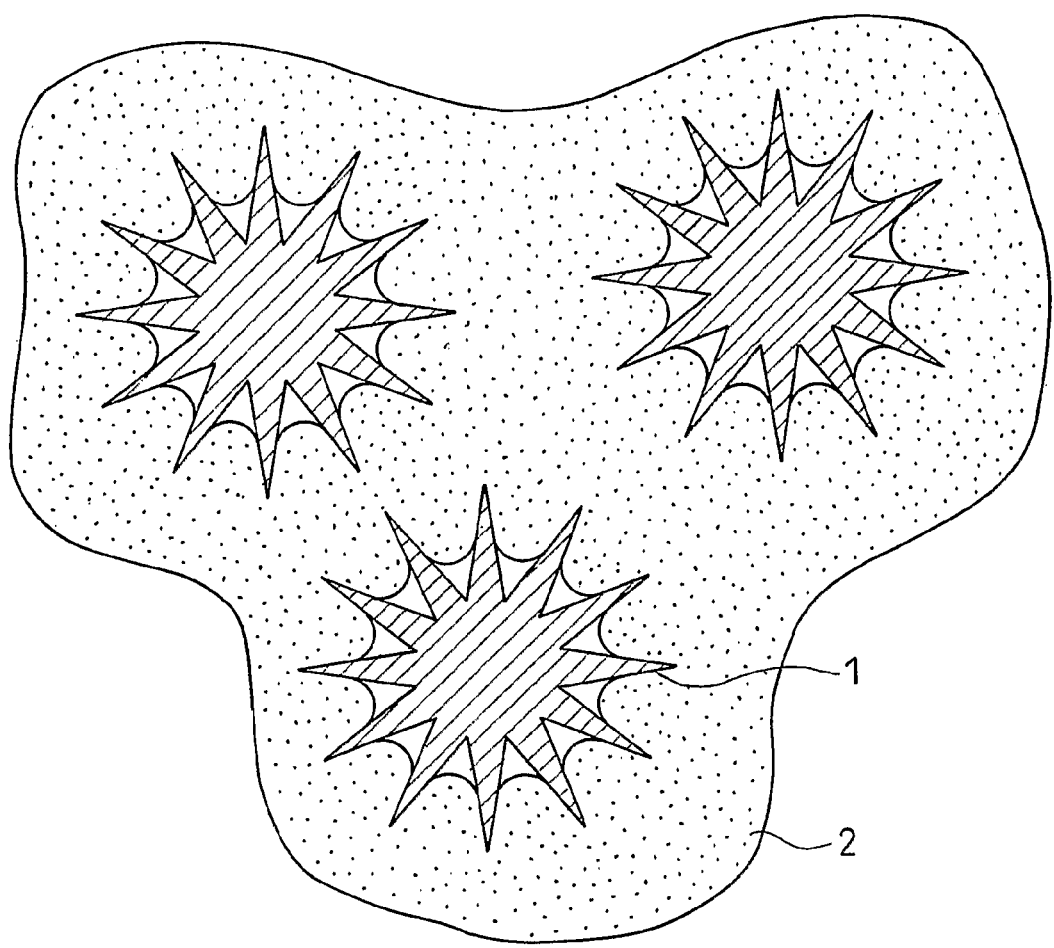
FIG. 1 is a schematic diagram showing catalyst-supporting carriers (Pt/CNH) 1 comprising carbon nanohorn aggregates supporting catalytic metals, which are coated with a polymer electrolyte (Nafion) 2 typified by Nafion®, according to a conventional technique.
Figure 2:
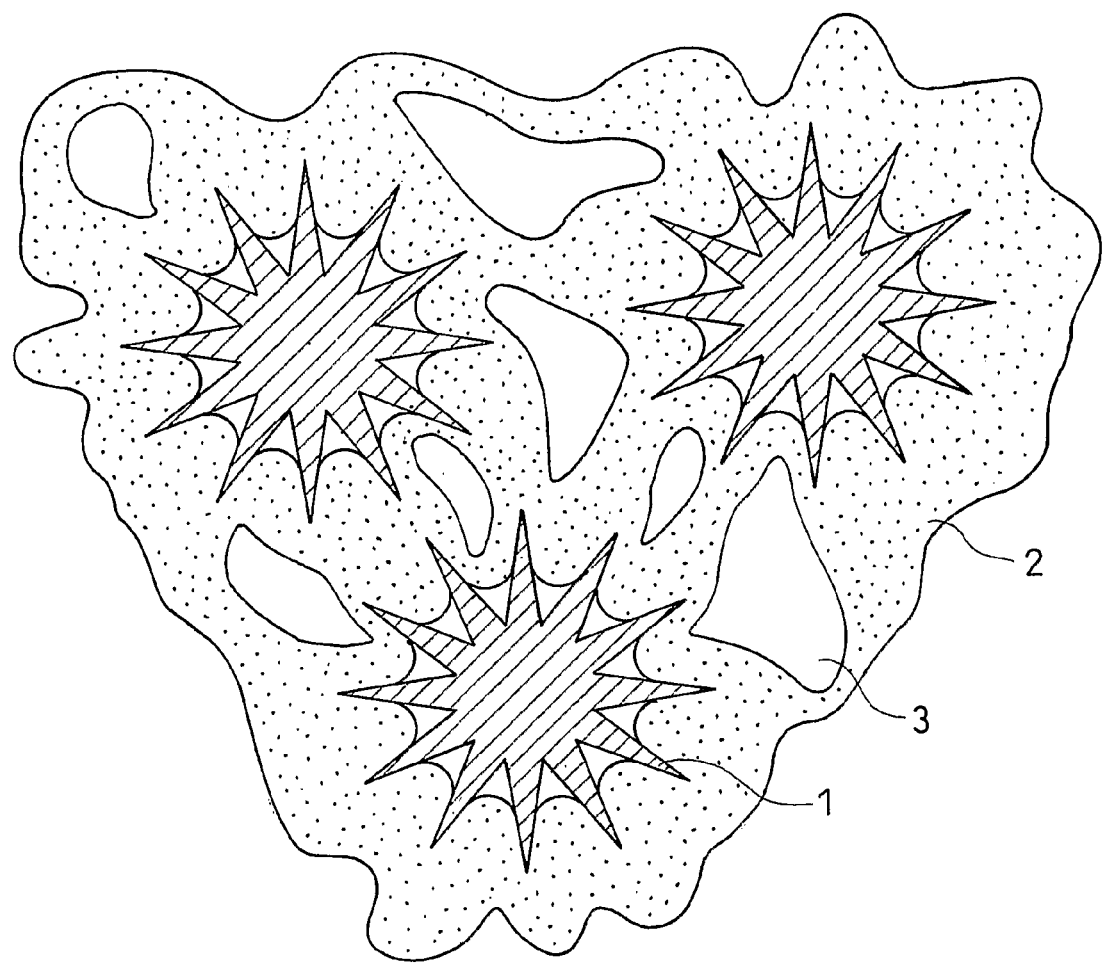
FIG. 2 is a schematic diagram showing catalyst-supporting carriers (Pt/CNH) 1 comprising carbon nanohorn aggregates supporting catalytic metals such as platinum, which are coated with a polymer electrolyte (Nafion) 2 typified by Nafion®, according to the present invention.

As shown in FIG. 1 and FIG. 2, the "carbon nanohorn aggregates" supporting catalytic metals are spherical aggregates of carbon nanohorns that are carbon isotopes consisting of carbon atoms. The term "spherical" used herein does not necessarily refer to a regular sphere, and it may refer to aggregates in the oval, toroidal, or various other forms.

FIG. 1 is a schematic diagram showing catalyst-supporting carriers (Pt/CNH) 1 comprising carbon nanohorn aggregates supporting catalytic metals such as platinum, which are coated with a polymer electrolyte (Nafion) 2 typified by Nafion®, according to a conventional technique. Since gaps between catalyst-supporting carriers (Pt/CNH) 1 or spaces among catalyst-supporting carriers (Pt/CNH) 1 are densely coated with a polymer electrolyte (Nafion) 2, a triple phase boundary where reaction gas, catalytic metals, and polymer electrolytes meet cannot be sufficiently provided, and catalyst efficiency cannot be improved.

In contrast, FIG. 2 is a schematic diagram showing catalyst-supporting carriers (Pt/CNH) 1 comprising carbon nanohorn aggregates supporting catalytic metals such as platinum, which are coated with a polymer electrolyte (Nafion) 2 typified by Nafion®, according to the present invention. Since the catalyst-supporting carriers (Pt/CNH) 1 are not densely coated, micropores 3 with pore diameters of about 0.005 μm to 0.1 μm, where a polymer electrolyte (Nafion) 2 is not present, are present in gaps between catalyst-supporting carriers (Pt/CNH) 1 or spaces among catalyst-supporting carriers (Pt/CNH) 1. Thus, a triple phase boundary where reaction gas, catalytic metals, and polymer electrolytes meet can be sufficiently provided, and catalyst efficiency can be improved.

Figure 3:
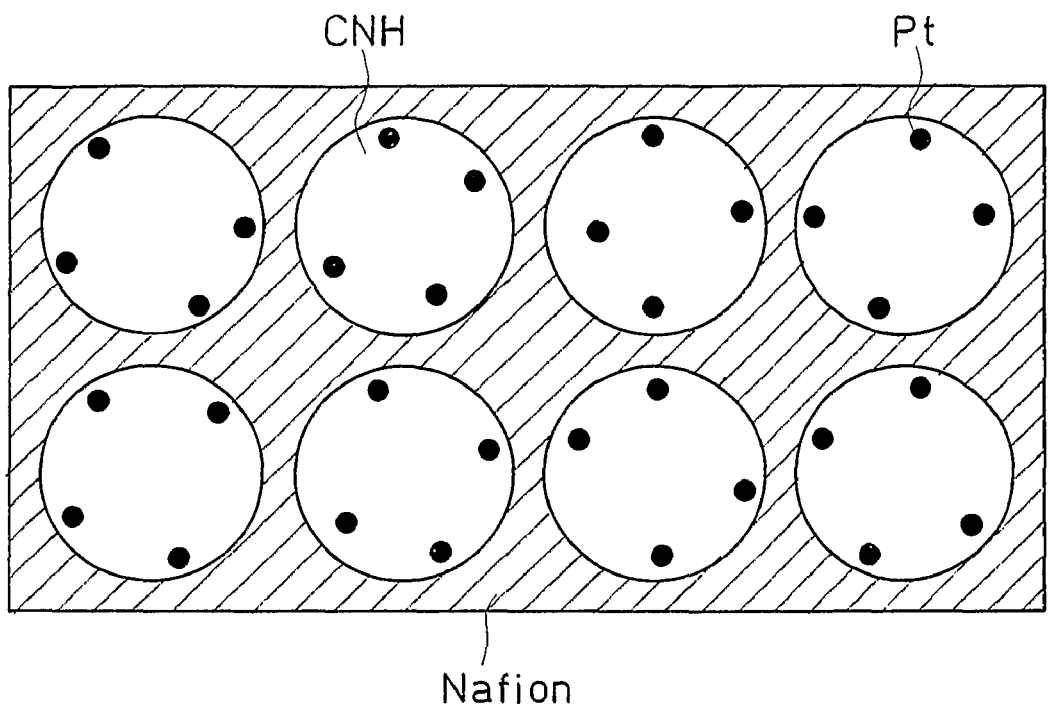
FIG. 3 is another schematic diagram showing catalyst-supporting carriers comprising carbon nanohorn aggregates (CNH) supporting catalytic metals such as platinum (Pt), which are densely coated with a polymer electrolyte (Nafion) typified by Nafion®, according to a conventional technique.
Figure 4:
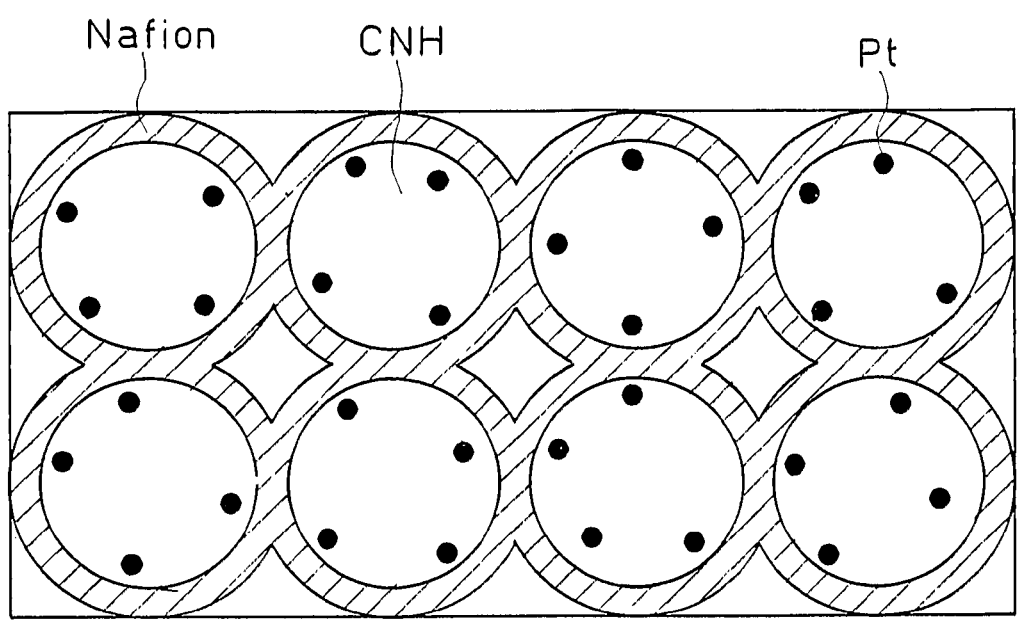
FIG. 4 is another schematic diagram showing catalyst-supporting carriers comprising carbon nanohorn aggregates (CNH) supporting catalytic metals such as platinum (Pt), which are thinly coated with a polymer electrolyte (Nafion) typified by Nafion®, according to the present invention.

FIG. 3 is another schematic diagram showing catalyst-supporting carriers comprising carbon nanohorn aggregates (CNH) supporting catalytic metals such as platinum (Pt), which are densely coated with a polymer electrolyte (Nafion) typified by Nafion®, according to a conventional technique. FIG. 4 is another schematic diagram showing catalyst-supporting carriers 1 comprising carbon nanohorn aggregates (CNH) supporting catalytic metals such as platinum (Pt), which are thinly coated with a polymer electrolyte (Nafion) typified by Nafion®, according to the present invention. Unlike the case shown in FIG. 3, micropores, where a polymer electrolyte (Nafion) is not present, are present in gaps of catalyst-supporting carriers or spaces among catalyst-supporting carriers.

As carbon nanohorns (CNH) that are used as carriers for electrode catalysts of MEA for the fuel cell of the present invention, carbon nanohorn aggregates that are spherical aggregates of carbon nanohorns are used. The term "spherical" used herein does not necessarily refer to a regular sphere, and it may refer to aggregates in the oval, toroidal, or various other forms.

A carbon nanohorn aggregate is a tubular body, each carbon nanotube constituting the same has at one end a conical shape, and such aggregate is an assembly of a plurality of conical portions in such a manner that conical portions project from the surface as horns and a plurality of conical portions gather around the tube by the Van der Waals force that works among conical portions. The diameter of such carbon nanohorn aggregate is 120 nm or smaller, and typically between 10 nm and 100 nm.

Each carbon nanohorn that constitutes a carbon nanohorn aggregate has a tube diameter of approximately 2 nm, a typical length thereof is between 30 nm and 50 nm, and the inclination at the axial cross sections of the conical portions is approximately 20 degrees on average. Because of such distinctive structure, a carbon nanohorn aggregate has a packing structure with a very large specific surface area.

In general, a carbon nanohorn aggregate can be produced at room temperature in an inert gas atmosphere of $1.01325 \times 10^5$ Pa by a laser ablation method that targets a solid carbon simplex such as a graphite. The pore size among spherical particles of a carbon nanohorn aggregate can be regulated by the production conditions of the laser ablation method, oxidation treatment after the production, or the like. At the center of a carbon nanohorn aggregate, carbon nanohorns are chemically bound to each other, or carbon nanotubes may be curled up like balls, although the shape is not limited by the structure of the center portion. Alternatively, the center portion may be hollow.

Carbon nanohorns that constitute a carbon nanohorn aggregate may have closed or open ends. Also, tips of cones at one ends may be curled ends. When tips of cones at one ends of carbon nanohorns that constitute a carbon nanohorn aggregate are curled ends, carbon nanohorns form a radial assembly with outward ends. Also, a carbon nanohorn structure may be partially incomplete and may have micropores. Further, part of a carbon nanohorn aggregate may be carbon nanotubes.

A carbon nanohorn aggregate can be a monolayer carbon nanohorn. This can improve hydrogen ion conductivity in a carbon nanohorn aggregate. Also, a carbon nanohorn aggregate can be a monolayer carbon nanohorn aggregate comprising monolayer graphite nanohorns. This can improve the electric conductivity of a carbon nanohorn aggregate. When such aggregate is used for catalytic electrodes for a fuel cell, accordingly, properties thereof can be improved.

Examples of catalytic metals that can be supported on carriers as electrode catalysts for the fuel cell of the present invention include the following. Examples of anode catalysts include platinum, rhodium, palladium, iridium, osmium, ruthenium, rhenium, gold, silver, nickel, cobalt, lithium, lanthanum, strontium, and yttrium. These substances can be used alone or in combinations of two or more. As cathode catalysts, the same substances used for the anode catalysts can be used, and the above-exemplified substances can be used. The anode catalysts and the cathode catalysts may be the same with or different from each other.

The polymer electrolytes used for the fuel cell of the present invention electrically connect carbon nanohorn aggregates supporting catalytic metals with a solid electrolyte membrane on the catalyst electrode surfaces and deliver a fuel to the catalytic metal surface. Thus, hydrogen ion conductivity is required. When an organic liquid fuel such as methanol is fed to the anode, fuel permeability is required. When such fuel is fed to the cathode, oxygen permeability is required. In order to fulfill such requirements, materials having excellent properties in terms of hydrogen ion conductivity or organic liquid fuel permeability of methanol or the like are preferably used as polymer electrolytes. Specifically, organic polymers having polar groups such as strong acid groups, such as sulfone or phosphate groups or weak acid groups, such as carboxyl groups, are preferably used. Examples of such organic polymers include sulfone group-containing perfluorocarbon (Nafion (Du Pont), Aciplex (Asahi Kasei Corporation)), carboxyl group-containing perfluorocarbon (Flemion S membrane (Asahi Glass Co., Ltd.)), copolymers such as polystyrenesulfonic acid copolymer, polyvinylsulfonic acid copolymer, bridged alkylsulfonic acid derivative, and fluorine-containing polymer made of fluorine resin skeleton and sulfonic acid, and copolymers prepared by co-polymerizing acrylamide such as acrylamide-2-methylpropane sulfonic acid and acrylate such as n-butylmethacrylate.

Further, the aforementioned organic polymers having polar groups such as strong acid groups or weak acid groups can be used as polymer electrolytes. Examples of the polymers to which the polar group is to be bound include: resins having nitrogen or a hydroxyl group such as polybenzimidazole derivative, polybenzoxazole derivative, crosslinked polyethyleneimine, polycylamine derivative, amine-substituted polystyrene such as polydiethyl-aminoethylpolystyrene, and nitrogen-substituted polyacrylate such as diethylaminoethylpolymethacrylate; hydroxyl group-containing polyacryl resins represented by silanol-containing polysiloxane and hydroxyethylpolymethyl acrylate; and hydroxyl group-containing polystyrene resins represented by parahydroxypolystyrene.

A crosslinking substituent such as a vinyl, epoxy, acryl, methacryl, cinnamoyl, methylol, azide, or naphthoquinone diazide group can be suitably introduced into the above polymers.

The above polymer electrolytes of the fuel electrode and of the oxidant electrode may be the same with or different from each other.

In the present invention, the amount of the polymer electrolytes is preferably less than 10% of the sum of the amounts of the polymer electrolytes and the catalyst supporting carbon nanohorn aggregates, from the viewpoint of catalyst utilization efficiency.

Figure 5:
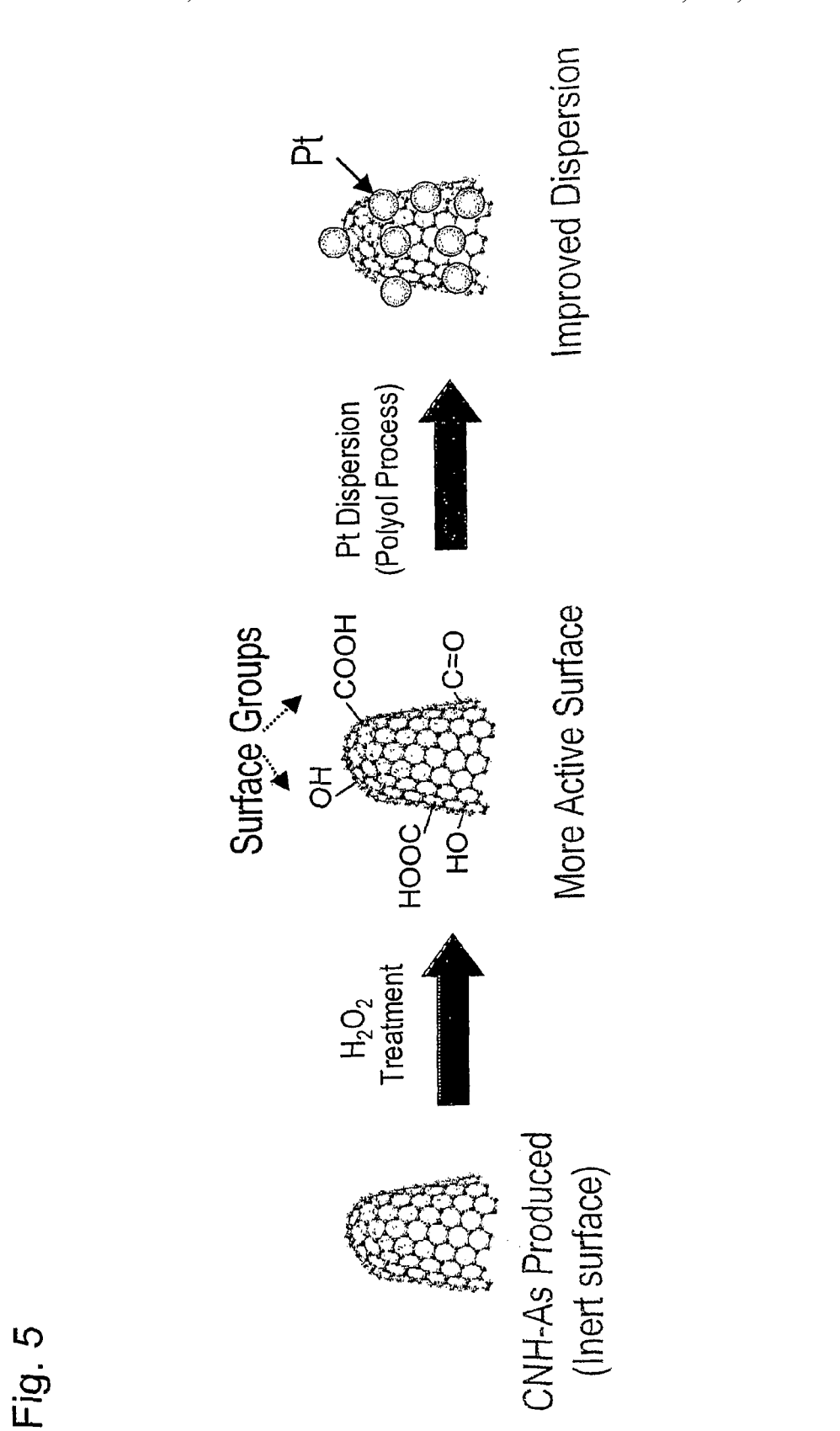
FIG. 5 is a conceptual diagram showing a pretreatment of carbon nanohorn aggregates with a hydrogen peroxide solution and the subsequent polyol process conducted with the use of ethylene glycol.

In the present invention, carbon nanohorn aggregates are preferably pretreated with a hydrogen peroxide solution in order to promote the supporting of catalytic metals on carbon nanohorn aggregate carriers and the coating thereof with polymer electrolytes. FIG. 5 is a conceptual diagram showing a pretreatment of carbon nanohorn aggregates with a hydrogen peroxide solution and the subsequent polyol process conducted with the use of ethylene glycol. As shown in FIG. 5, various surface groups are generated on the carbon nanohorn surfaces via the pretreatment conducted with the use of a hydrogen peroxide solution. Upon dispersion of catalytic metals such as platinum in the presence of polyol, dispersion of such catalytic metals on the carbon nanohorn surfaces is promoted by the presence of surface groups.

Technical significances of the pretreatment of carbon nanohorn aggregates with a hydrogen peroxide solution are as follows: (1) a carbon nanohorn structure is not destructed by a hydrogen peroxide solution; (2) a hydrogen peroxide solution oxidizes and removes amorphous impurities from the carbon nanohorn; (3) surface groups, such as hydroxyl, carboxylic acid, or carbonyl groups, are generated on the carbon nanohorn surfaces with the aid of a hydrogen peroxide solution as shown in FIG. 5, and the like.

Ethylene glycol (EG) has low surface tension and it adheres to the carbon nanohorn surface as a liquid droplet. When a Pt-containing saline is brought into contact therewith, reduction takes place in a 1-step process. Specifically, ethylene glycol is dehydrated and converted into acetaldehyde, and acetaldehyde reduces Pt(II) to Pt to yield diacetyl.

Subsequently, a method for producing catalytic electrodes for MEA for the fuel cell of the present invention is described. Catalytic metals can be supported on carbon nanohorn aggregates by a conventional immersion technique. In this technique, metal salts of catalytic metals are dissolved or dispersed in a solvent to prepare colloidal catalytic substances, and the catalytic substances are supported on carbon nanohorn aggregates, followed by reduction. By performing reduction at 130° C. or higher (including room temperature), the average particle diameter of catalytic metals supported onto the surfaces of the carbon nanohorn aggregates can be adjusted to be relatively large, i.e., 3.2 nm or greater. Further, catalytic metals can be uniformly dispersed on carbon nanohorn particles. Subsequently, catalyst supporting carbon particles and polymer electrolyte particles are dispersed in a solvent to prepare a paste, and the paste is applied on a substrate, followed by drying. Thus, catalytic electrodes for a fuel cell can be obtained.

The carbon nanohorn aggregates may be supported on carbon fibers, carbon nanofibers, carbon nanotubes, or the like via heat treatment or other means. Thus, a fine structure of a catalytic layer can be arbitrarily regulated.

A substrate may be coated with a paste by any means without particular limitation. For example, such coating can be carried out by brush coating, spray coating, or screen printing. A paste is coated to a thickness of approximately 1 µm to 2 mm, for example. After the paste is coated, the substrate is heated at a temperature for a duration suitable for a fluorine, resin to be used, in order to prepare a fuel electrode and an oxidant electrode. The heating temperature and the heating duration are adequately determined in accordance with the material to be used. For example, the heating temperature can be between 100° C. and 250° C., and the heating duration can be between 30 seconds and 30 minutes.

Hereafter, an application of MEA to a fuel cell is described. In the solid polymer fuel cell, a solid electrolytic membrane isolates the anode from the cathode and allows hydrogen ions or water molecules to migrate therebetween. Thus, a solid electrolytic membrane preferably has high hydrogen ion conductivity. Also, a solid electrolytic membrane is preferably chemically stable and has sufficient mechanical strength.

As the material configuring the solid electrolyte membrane, organic polymers having polar groups such as strong acid groups such as sulfone, phosphate, phosphone, and phosphine groups or weak acid groups such as carboxyl groups are preferably used. Examples of such organic polymers include aromatic group-containing polymers such as sulfonated poly (4-phenoxybenzoyl-1,4-phenylene) and alkylsulfonated polybenzimidazol, copolymers such as polystyrenesulfonic acid copolymer, polyvinylsulfonic acid copolymer, bridged alkylsulfonic acid derivative, and fluorine-containing polymer made of fluorine resin skeleton and sulfonic acid, copolymers prepared by co-polymerizing acrylamide such as acrylamide-2-methylpropane sulfonic acid and acrylate such as n-butylmethacrylate, sulfone group-containing perfluorocarbon (Nafion (Du Pont, registered trademark), Aciplex (Asahi Kasei Corporation)), and carboxyl group-containing perfluorocarbon (Flemion S membrane (Asahi Glass Co., Ltd., registered trademark)).

A gas or liquid fuel can be used as a fuel to be fed to a fuel cell. When a gas fuel is used, for example, hydrogen can be used. When a liquid fuel is used, for example, alcohols such as methanol, ethanol, or propanol, ethers such as dimethyl ether, cycloparaffins such as cyclohexane, cycloparaffins having hydrophilic groups such as hydroxyl, carboxyl, amino, or amide groups, or monosubstituted or disubstituted cycloparaffin can be used as an organic compound to be contained in a fuel. The term "cycloparaffin" used herein refers to cycloparaffin or a substitution product thereof, and it refers to a compound other than an aromatic compound.

The thus obtained solid polymer fuel cell comprises, as catalyst supporting carbon particles, a carbon nanohorn aggregate. By adjusting the proportion of the polymer electrolyte to the carbon nanohorn aggregate to 0.32:1 to 0.70:1 by weight, the catalyst layer in MEA for a fuel cell can comprise micropores with pore diameters of 0.005 µm to 0.1 µm disposed among the polymer electrolytes. As a result, the fuel cell of the present invention can sufficiently provide a triple phase boundary in the catalyst layer, and a small amount of catalytic metals can be effectively used in the reaction. Thus, the efficiency of catalyst utilization is improved and the power generation efficiency is improved with the use of the same amount of materials. The power generation properties in the high current density region are particularly improved.

Figure 6:
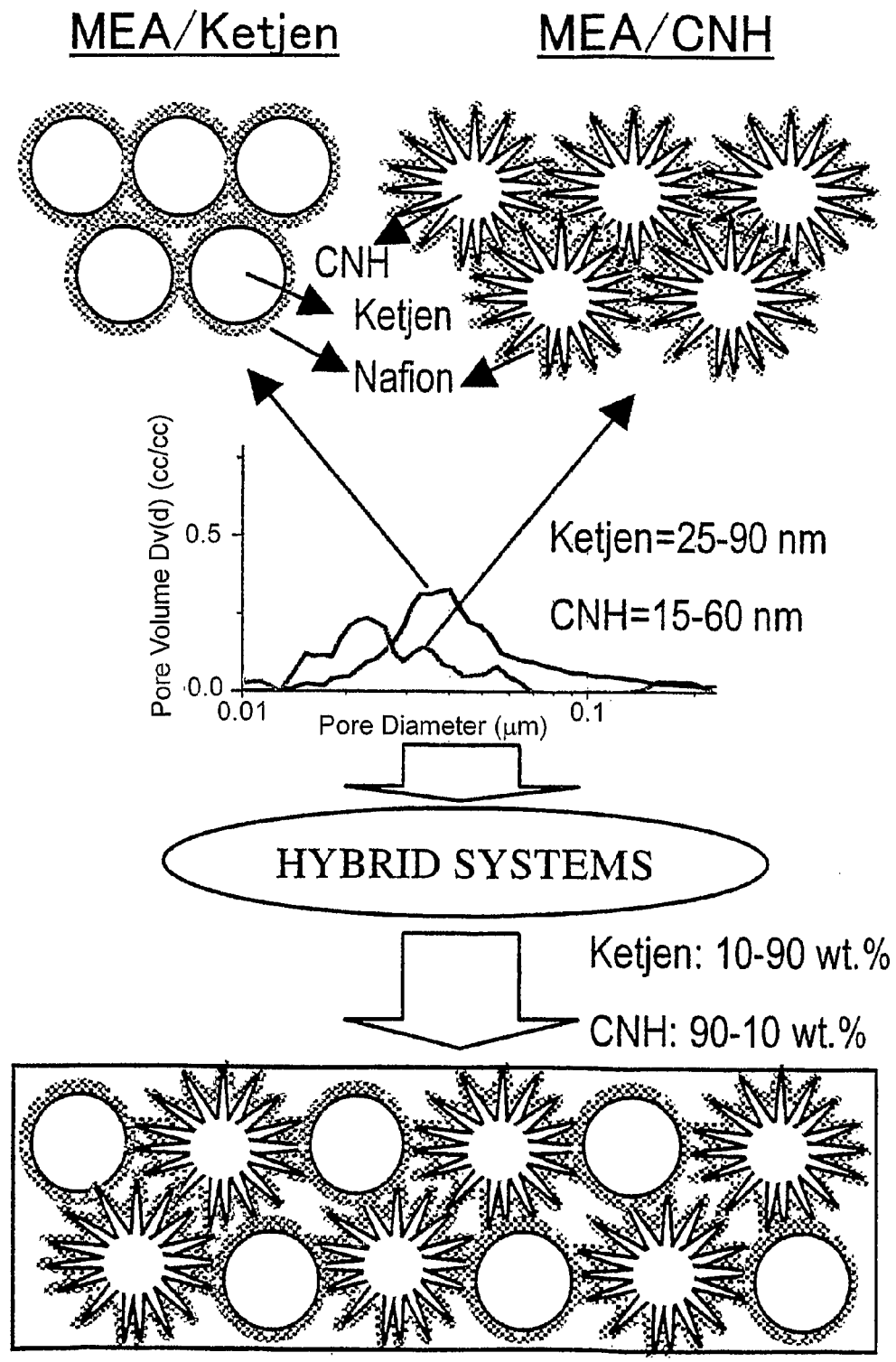
FIG. 6 schematically shows a case where carbon nanohorn aggregates are used in combination with carbon black (the hybrid systems) as catalyst-supporting carriers.

FIG. 6 schematically shows a case where a carbon nanohorn aggregate is used in combination with carbon black (the hybrid systems), as well as a case where a carbon nanohorn aggregate are used alone, as a catalyst-supporting carrier. Carbon nanohorn aggregates (CNH) that support catalytic metals such as platinum and carbon black (Ketjen (trade name)) that supports catalytic metals such as platinum each independently form relatively dense aggregates. Specifically, carbon black (Ketjen (trade name)) that supports catalytic metals such as platinum has an average pore diameter of 25 nm to 90 nm, and carbon nanohorn aggregates (CNH) that support catalytic metals such as platinum have an average pore diameter of 15 nm to 60 nm. If carbon black (Ketjen (trade name)) that supports catalytic metals such as platinum is mixed with carbon nanohorn aggregates (CNH) that support catalytic metals such as platinum in amounts of 10:90 to 90:10 by weight, particles with an average pore diameter larger than the above average pore diameter can be obtained.

Figure 7:
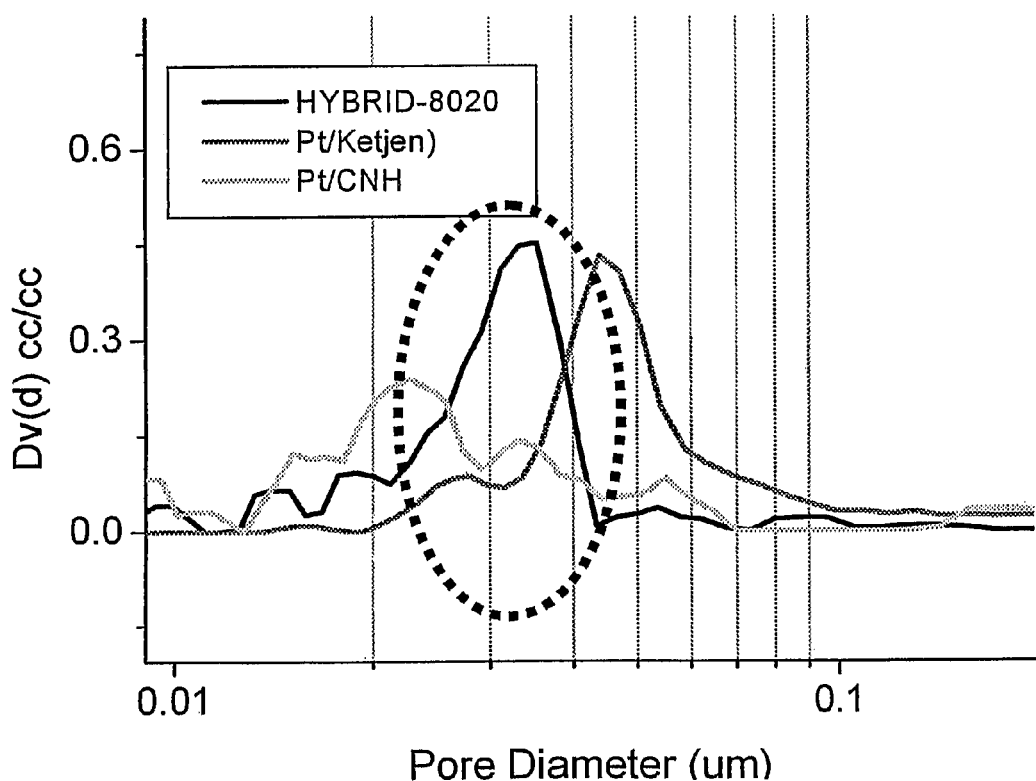
FIG. 7 shows the average pore diameter distribution of platinum-supporting carbon nanohorn aggregates (CNH), the average pore diameter distribution of platinum-supporting carbon black (Ketjen (trade name)), and the arithmetic average pore diameter distribution thereof.
Figure 8:
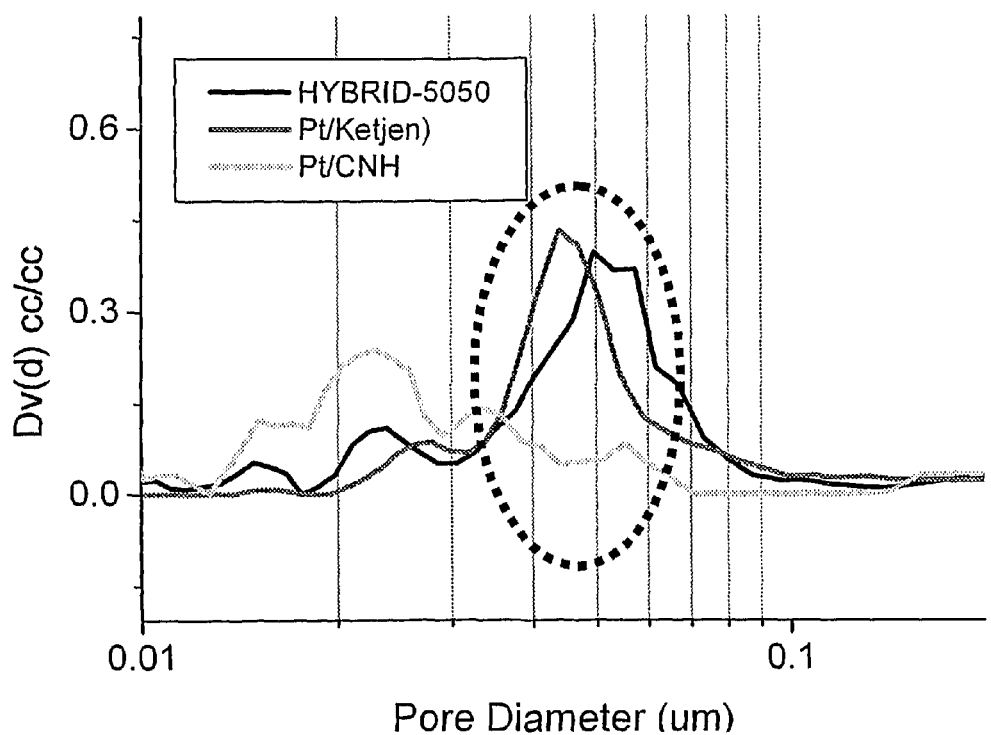
FIG. 8 shows the average pore diameter distribution of mixtures of platinum-supporting carbon nanohorn aggregates (CNH) and platinum-supporting carbon black (Ketjen (trade name)), when the average pore diameters thereof are substantially equivalent to each other.
Figure 9:
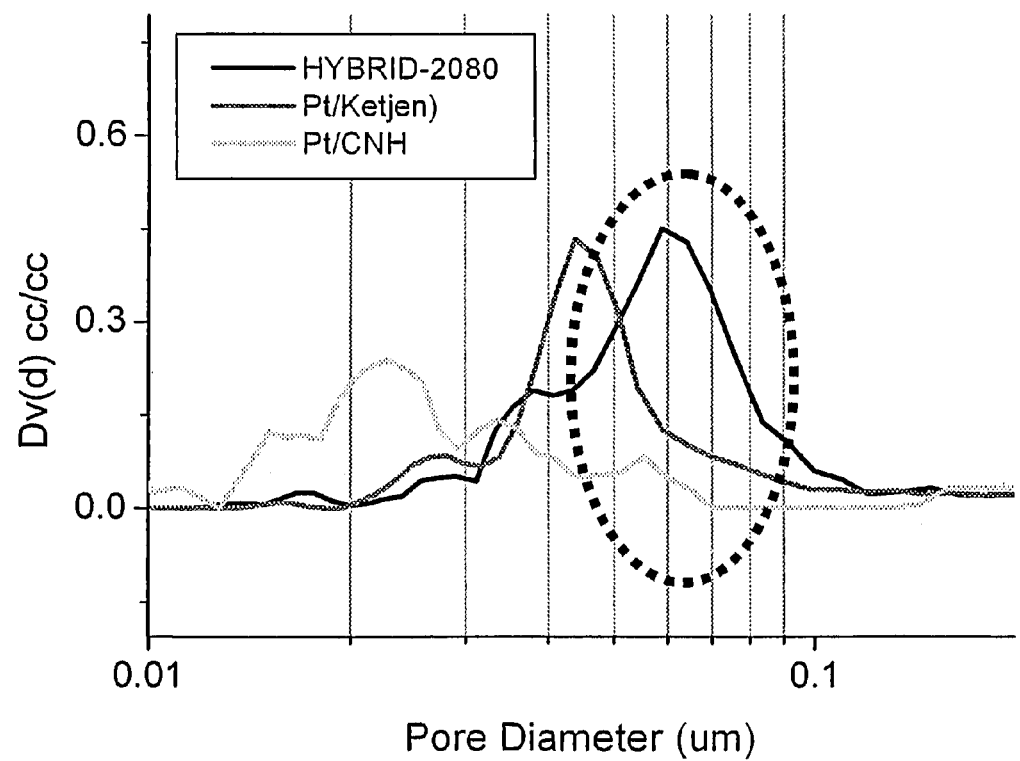
FIG. 9 shows the average pore diameter distribution of mixtures of platinum-supporting carbon nanohorn aggregates (CNH) and platinum-supporting carbon black (Ketjen (trade name)), when the average pore diameter of the former is greater than that of the latter.

FIG. 7 shows the average pore diameter distribution of platinum-supporting carbon nanohorn aggregates (CNH), the average pore diameter distribution of platinum-supporting carbon black (Ketjen (trade name)), and the arithmetic average pore diameter distribution thereof. FIG. 8 shows the average pore diameter distribution of mixtures of platinum-supporting carbon nanohorn aggregates (CNH) and platinum-supporting carbon black (Ketjen (trade name)), when the average pore diameters thereof are substantially equivalent to each other. FIG. 9 shows the average pore diameter distribution of mixtures of platinum-supporting carbon nanohorn aggregates (CNH) and platinum-supporting carbon black (Ketjen (trade name)), when the average pore diameter of the former is greater than that of the latter.

As shown in FIG. 7 to FIG. 9, particularly when the average pore diameter of carbon nanohorn aggregates (CNH) that support catalytic metals such as platinum is equivalent to or greater than that of carbon black (Ketjen (trade name)) that supports catalytic metals such as platinum, the average pore diameter of the mixtures thereof becomes greater. Thus, a triple phase boundary where reaction gas, catalytic metals, and polymer electrolytes meet can be sufficiently provided, and catalyst efficiency can be improved.

Unlike the case shown in FIG. 3 where catalyst-supporting carriers comprising carbon nanohorn aggregates (CNH) that support catalytic metals such as platinum (Pt) are densely coated with polymer electrolytes (Nafion) typified by Nafion®, micropores, in which polymer electrolytes (Nafion) are not present, are present in gaps of catalyst-supporting carriers or spaces among catalyst-supporting carriers, when a carbon nanohorn aggregate is used in combination with carbon black (the hybrid systems). Compared with the case of the present invention shown in FIG. 4 where catalyst-supporting carriers 1 comprising carbon nanohorn aggregates (CNH) that support catalytic metals such as platinum (Pt) are thinly coated with polymer electrolytes (Nafion) typified by Nafion®, more micropores, in which polymer electrolytes (Nafion) are not present, are present in gaps of catalyst-supporting carriers or spaces among catalyst-supporting carriers, when a carbon nanohorn aggregate is used in combination with carbon black (the hybrid systems).

Specifically, use of the carbon nanohorn aggregate in combination with carbon black enables the catalyst layer to comprise micropores with pore diameters of 0.005 μm to 0.1 μm disposed among the polymer electrolytes. As a result, a triple phase boundary where reaction gas, catalysts, and electrolytes meet can be sufficiently provided in the catalyst layer. This can improve the catalyst efficiency. The power generation properties in the high current density area are particularly improved.

EXAMPLES

Hereafter, catalytic electrodes for a fuel cell according to the present invention and a fuel cell using the same are described in greater detail with reference to the examples, although the technical scope of the present invention is not limited thereto.

Example 1

High-purity carbon nanohorns and, as metal sources, chlorides, nitric acids, organic matters, or the like, such as Pt, Rh, Co, Cr, Fe, or Ni, were prepared. Ethylene glycol was prepared as a polyol.

Figure 10:
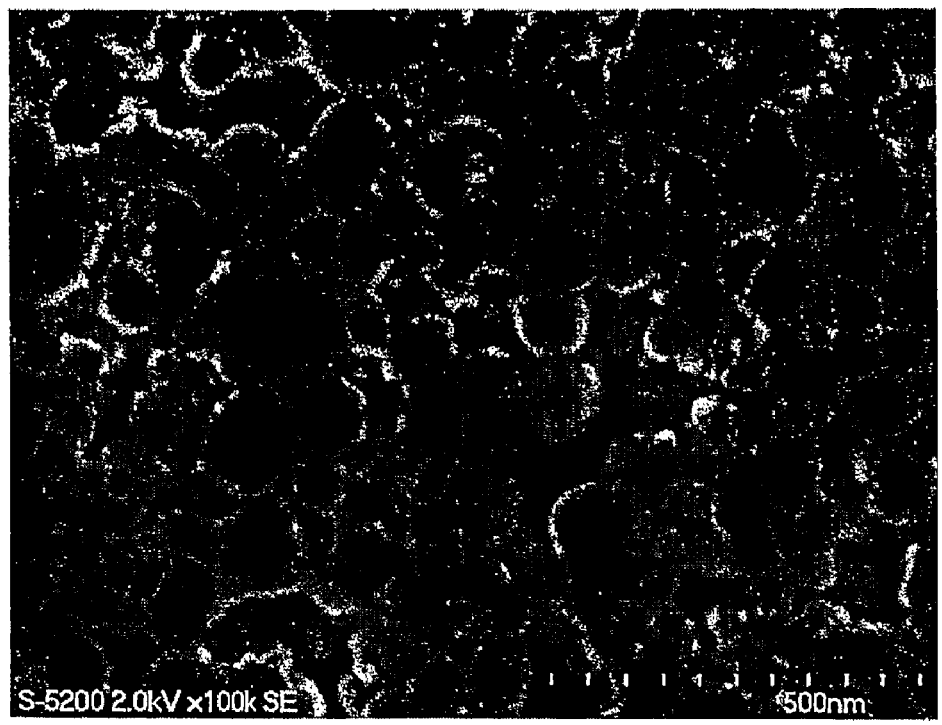
FIG. 10 shows a TEM photograph of catalyst-supporting carriers obtained in Example 1.

The surfaces of carbon nanohorn samples were activated via pretreatment with a hydrogen peroxide solution. Catalytic metals were supported via a polyol process involving the use of polyol with low surface tension. The proportion of platinum (Pt) to be supported to CNH was set to be 0.40:1 by weight, and reduction was carried out at 140° C. for 8 hours. Following filtration and drying, baking was carried out as a post-treatment in the presence of an inert gas at 100° C. The obtained electrode catalysts were processed into an ink by a conventional technique, and the prepared ink was coated via casting to prepare a catalyst layer of MEA. A TEM photograph was taken, and the active Pt area and the $O_2$ reduction current of the product were determined by the rotating disk electrode (RDE) method. FIG. 10 shows a TEM photograph.

According to the TEM photograph shown in FIG. 10, the presence of micropores, in which polymer electrolytes (Nafion) are not present, was observed among catalyst-supporting carriers.

Examples 2 and 3

The procedure of Example 1 was carried out except that the proportion of Pt/CNH was set to be 0.50 or 0.60.

Comparative Examples 1 and 2

Figure 11:
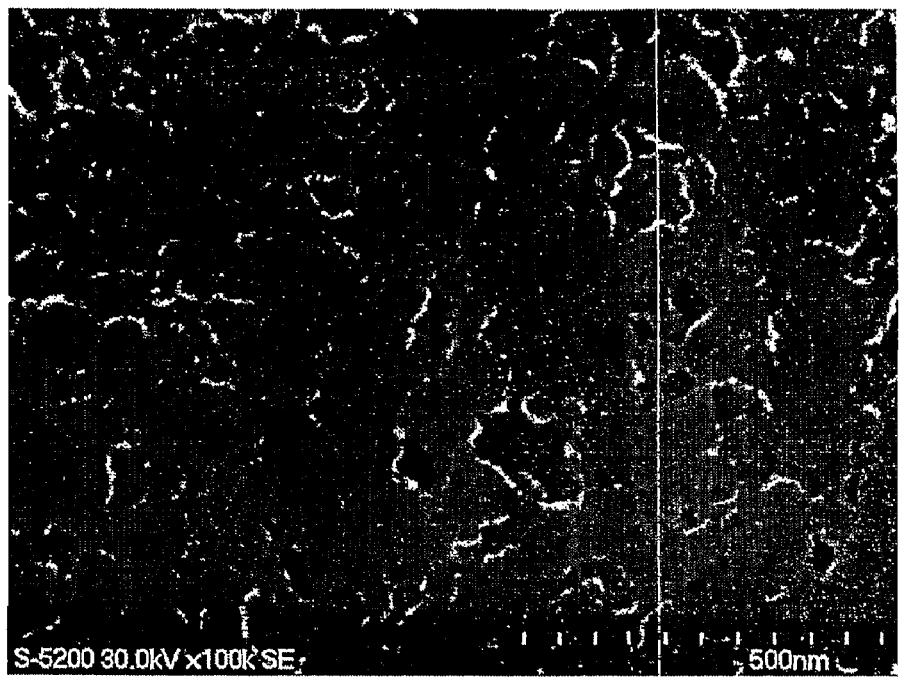
FIG. 11 shows a TEM photograph of catalyst-supporting carriers obtained in Comparative Example 2.

The procedure of Example 1 was carried out except that the proportion of Pt/CNH was set to be 0.30 or 0.75. A TEM photograph was taken. FIG. 11 shows a TEM photograph taken when the proportion of Pt/CNH was set to be 0.75. Compared with the case shown in FIG. 10, polymer electrolytes (Nafion) are more densely present among catalyst-supporting carriers.

Figure 12:
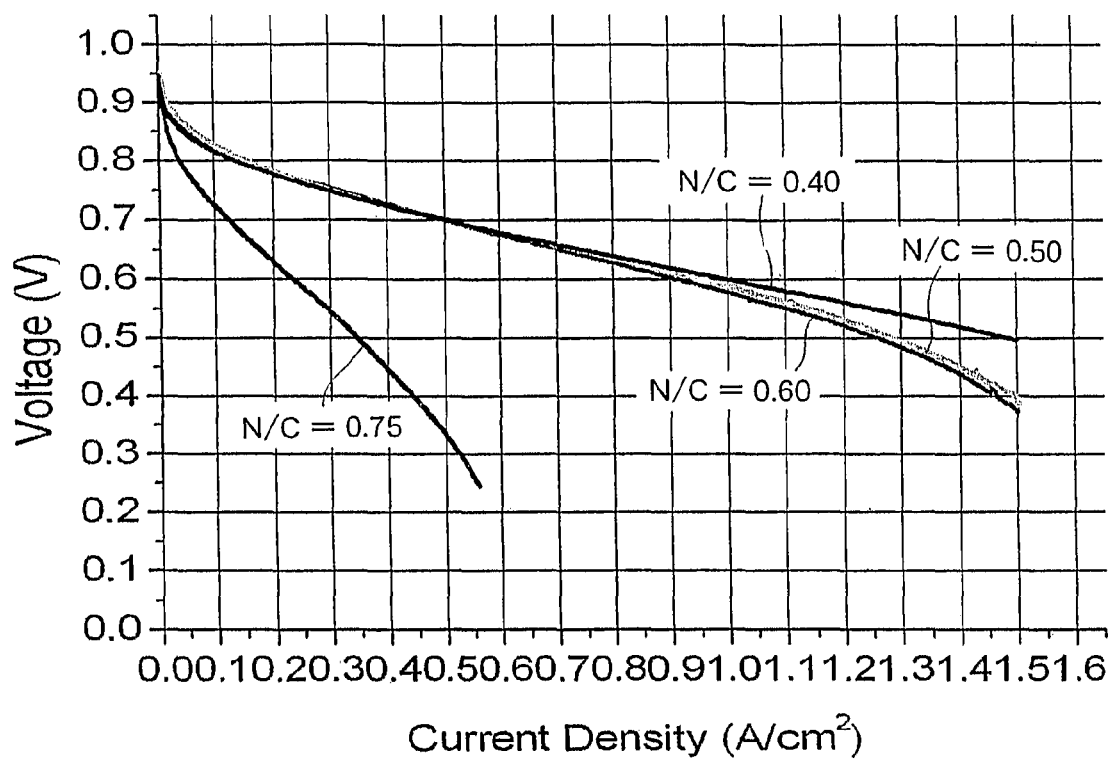
FIG. 12 shows the current-voltage curves of MEA obtained in Examples 1 to 3 and Comparative Example 2.

FIG. 12 shows the current-voltage curves of MEA obtained in Examples 1 to 3 and Comparative Example 2. Compared with the case where the proportion of Pt/CNH was 0.75, the power generation properties in the high current region were particularly excellent when the proportion of Pt/CNH was 0.40, 0.50, or 0.60.

Figure 13:
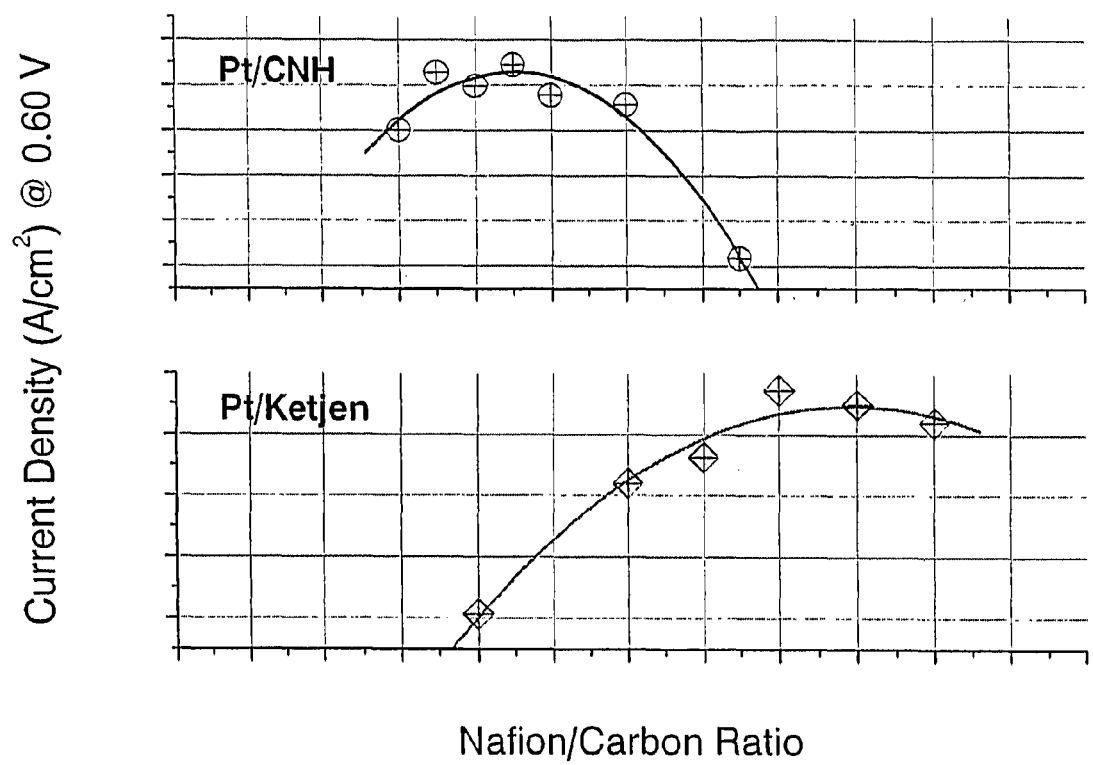
FIG. 13 shows the Pt/CNH dependence of current density obtained from MEA obtained in Examples 1 to 3 and Comparative Examples 1 and 2.

FIG. 13 shows the Pt/CNH dependence of current density obtained from MEA obtained in Examples 1 to 3 and Comparative Examples 1 and 2. FIG. 13 also shows the Pt/Ketjen dependence of current density when conventional carbon carriers, i.e., Ketjen (trade name), were used instead of the carbon nanohorn aggregates. According to FIG. 13, superior power generation properties are exhibited when the proportion of polymer electrolytes to the carbon nanohorn aggregates is 0.32:1 to 0.70:1 by weight, unlike the case involving the use of the aforementioned amounts of conventional Ketjen.

Examples 4, 5, and 6

Platinum-supporting carbon nanohorn aggregates having the same properties with the aggregates used in Example 1 were prepared (hereafter abbreviated as "Pt/CNH"), except that the proportion of platinum to be supported, i.e., Nafion®, to CNH was set to be 0.45:1 by weight. Similarly, platinum-supporting carbon black (Ketjen (trade name)) having the same properties with the carbon black used in Example 1 were prepared (hereafter abbreviated as "Pt/C"), except that the proportion of platinum to be supported, i.e., Nafion®, to CNH was set to be 0.75:1 by weight.

Pt/CNH was mixed with Pt/C at a proportion of 80:20 by weight (Example 4: HK-8020). Similarly, Pt/CNH- was mixed with Pt/C at a proportion of 50:50 by weight (Example 5: HK-5050). Also, Pt/CNG- was mixed with Pt/C at a proportion of 20:80 by weight (Example 6: HK-2080).

Figure 14:
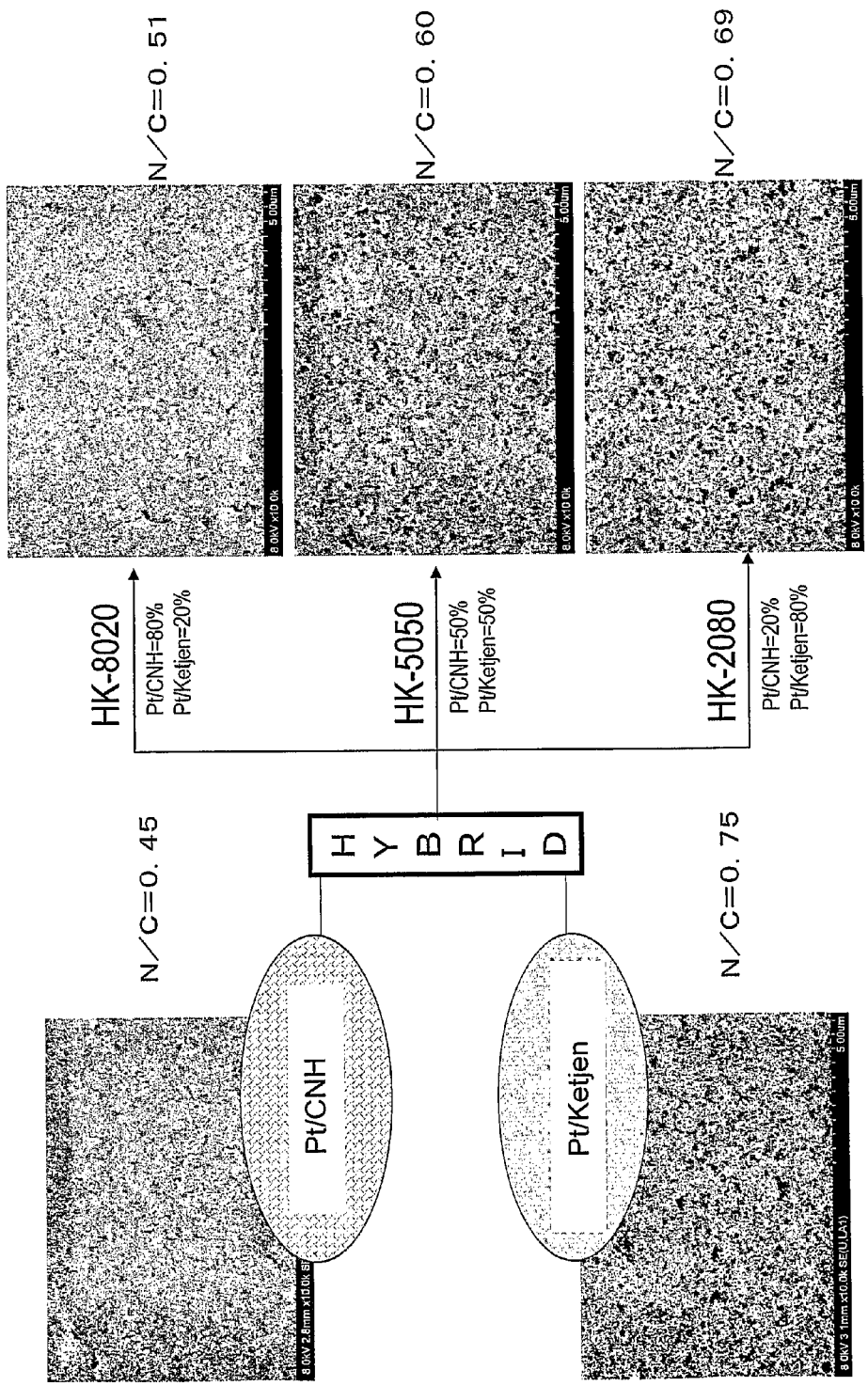
FIG. 14 shows the TEM photographs of catalyst-supporting carriers obtained in Examples 4 to 6.

FIG. 14 shows the TEM photographs thereof. Compared with the case where platinum-supporting carbon nanohorn aggregates (Pt/CNH) were used alone, mixtures of Pt/CNH- and Pt/C were found to be more porous.

Figure 15:
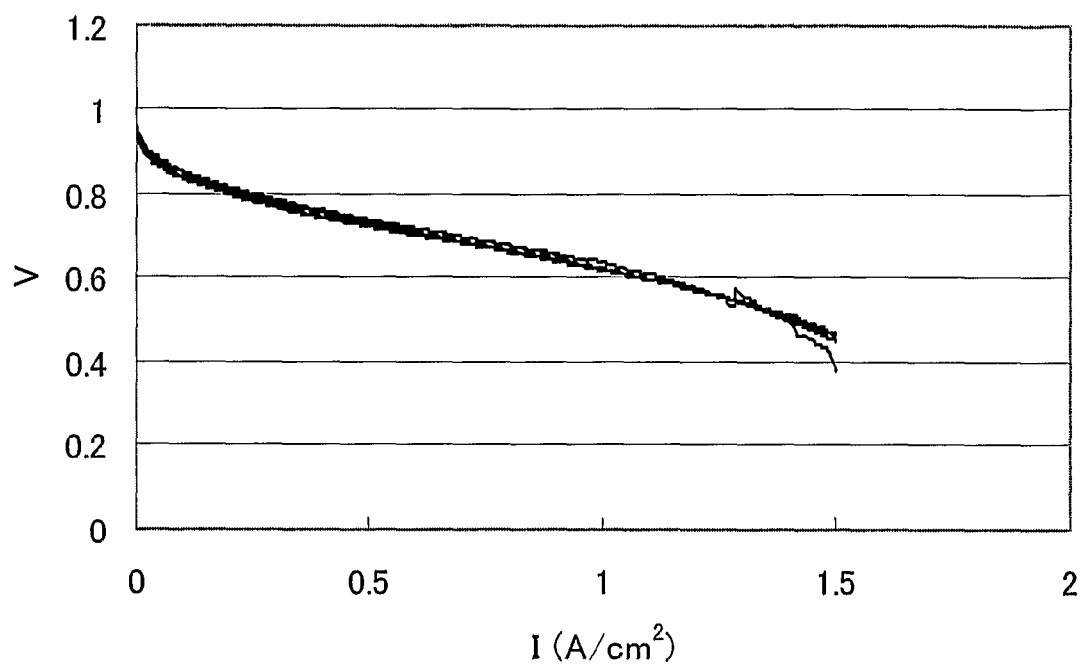
FIG. 15 shows the current-voltage curves of MEA obtained in Examples 4 to 6.
Figure 16:
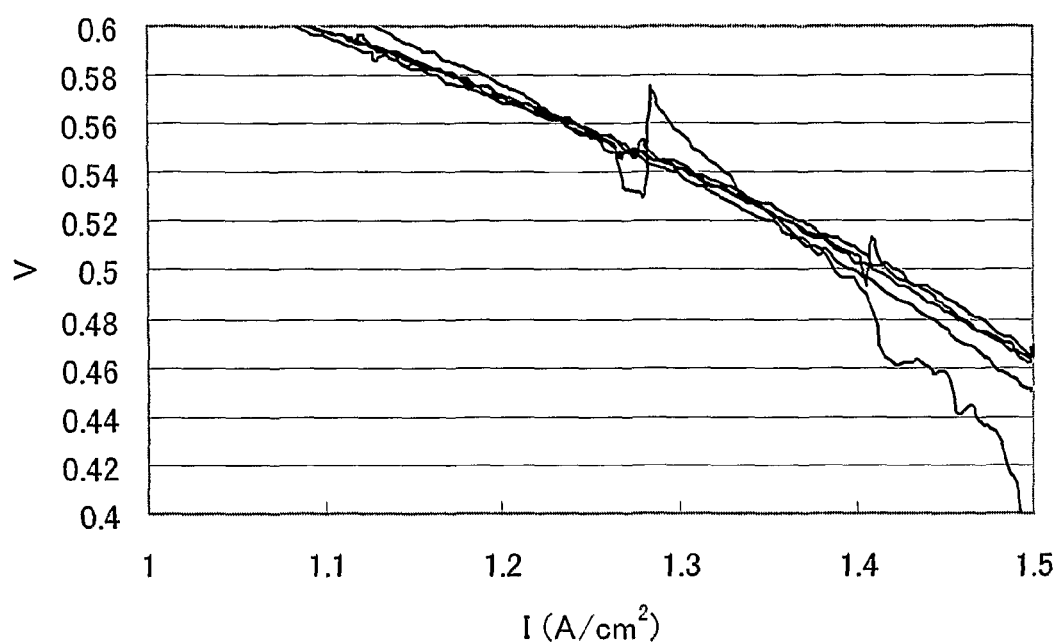
FIG. 16 shows an enlarged diagram of a high current region shown in FIG. 15.

The power generation properties were evaluated using MEA obtained in Example 4, 5, or 6. FIG. 15 shows current density-voltage curves of a mixed system of Pt/CNH- and Pt/CNH- (80:20) of Example 4, a mixed system of Pt/CNH- and Pt/CNH- (50:50) of Example 5, and a mixed system of Pt/CNH- and Pt/CNH- (20:80) of Example 6. For the purpose of comparison, FIG. 16 additionally shows the case where Pt/C (Ketjen) was used alone and the case where Pt/CNH was used alone. Further, FIG. 15 shows an enlarged diagram of a high current region shown in FIG. 14. Although FIG. 13 and FIG. 14 were not very clear, the power generation properties was deteriorated in a high current region when Pt/C (Ketjen) was used alone. When MEA obtained in Example 4, 5, or 6 was used, however, the power generation properties were not deteriorated in a high current region.

When Pt/C (Ketjen) was used alone, the power generation properties were deteriorated particularly in a high current region. This is considered to result from the following. That is, the presence of micropores among the polymer electrolytes in the catalyst layer is insufficient and gas circulation is inhibited. Also, even if micropores are present, the flooding phenomenon takes place that is easily blocked by generated water. In contrast, when the mixed system of Pt/CNH- and Pt/C of the present invention is employed, sufficient amounts of micropores are present among the polymer electrolytes in the catalyst layer, as shown in a schematic diagram of FIG. 6.

INDUSTRIAL APPLICABILITY

In the present invention, the proportion of the polymer electrolyte to the carbon nanohorn aggregate is regulated to 0.32:1 to 0.70:1 in the catalyst layer of the electrodes by weight. This enables the catalyst layer of MEA for a fuel cell to comprise micropores with pore diameters of 0.005 µm to 0.1 µm disposed among the polymer electrolytes. As a result, the fuel cell of the present invention can sufficiently provide a triple phase boundary where reaction gas, catalysts, and electrolytes meet in the catalyst layer. This can improve the power generation efficiency of the fuel cell, and the power generation properties in the high current density region are particularly improved. Also, use of a carbon nanohorn aggregate in combination with carbon black can further improve the catalyst efficiency, and the power generation properties in the high current density region are particularly improved.

Accordingly, the present invention contributes to the spreading of fuel cells.

The invention claimed is:

1. A solid polymer fuel cell comprising electrodes having a catalyst layer,
   the catalyst layer comprising:
   a carrier comprising a carbon nanohorn aggregate;
   catalytic metals supported on the carrier comprising the carbon nanohorn aggregate; and
   polymer electrolytes coating the carrier comprising the carbon nanohorn aggregate,
   wherein a proportion of the polymer electrolyte to the carbon nanohorn aggregate is 0.32:1 to 0.70:1 by weight.

2. The solid polymer fuel cell according to claim 1, wherein the catalyst layer has micropores with pore diameters of 0.005 µm to 0.1 µm disposed among the polymer electrolytes.

3. The solid polymer fuel cell according to claim 1 or 2, wherein the carrier comprising the carbon nanohorn aggregate comprises carbon black in addition to the carbon nanohorn aggregate, the proportion of the polymer electrolyte to the mixture of the carbon nanohorn aggregate and the carbon black is 0.30:1 to 0.10:1 by weight, and the proportion of the carbon black to the carbon nanohorn aggregate is 10:90 to 90:10 by weight.

4. A method for producing MEA used for a solid polymer fuel cell, comprising the steps of:
   preparing a catalyst layer by using a catalyst ink which comprises an electrode catalyst for a fuel cell and a solvent, the electrode catalyst of which has been prepared by allowing a carrier comprising carbon nanohorn aggregate to support catalytic metals and coating the carrier comprising carbon nanohorn aggregate with a polymer electrolyte; and
   producing MEA via hot press,
   wherein the catalyst ink comprises the catalytic metals in amounts of 40% to 70% by weight based on an amount of the carbon nanohorn aggregate, a proportion of the polymer electrolyte to the carbon nanohorn aggregate is 0.32:1 to 0.70:1 by weight, and the solvent is in an amount of 30 to 40 by weight based on an amount of the polymer electrolyte.

5. The method for producing MEA used for a solid polymer fuel cell according to claim 4, wherein the step of the preparing the catalyst layer comprises a step of dispersing catalytic metal salts in a solvent, a step of adding carbon nanohorn aggregate, a step of reducing, filtering, and drying the mixture while heating it, and a step of coating the obtained catalytic metal supporting carbon nanohorn aggregate with polymer electrolyte.

6. The method for producing MEA used for a solid polymer fuel cell according to claim 4 or 5, wherein the average particle diameter of the catalytic metals is between 3.2 nm and 4.6 nm.

7. The method for producing MEA used for a solid polymer fuel cell according to claim 4, wherein the carbon nanohorn aggregate is pretreated with a hydrogen peroxide solution.

8. The method for producing MEA used for a solid polymer fuel cell according to claim 4, wherein the carrier comprising the carbon nanohorn aggregate comprises carbon black in addition to the carbon nanohorn aggregate, the proportion of the polymer electrolyte to the mixture of the carbon nanohorn aggregate and the carbon black is 0.30:1 to 0.10:1 by weight, and the proportion of the carbon black to the carbon nanohorn aggregate is 10:90 to 90:10 by weight.

* * * * *